United States Patent
Yoshimura et al.

(10) Patent No.: US 7,707,570 B2
(45) Date of Patent: Apr. 27, 2010

(54) COMMUNICATION METHOD AND COMMUNICATION SYSTEM, AND INFORMATION RECEIVING DEVICE USED IN THE COMMUNICATION SYSTEM

(75) Inventors: Sohichi Yoshimura, Nara (JP); Naoyuki Kamei, Nara (JP); Kazushi Yamaneki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 795 days.

(21) Appl. No.: 11/053,949

(22) Filed: Feb. 10, 2005

(65) Prior Publication Data

US 2005/0193121 A1 Sep. 1, 2005

(30) Foreign Application Priority Data

Feb. 13, 2004 (JP) .............................. 2004-036925

(51) Int. Cl.
G06F 9/445 (2006.01)
G06F 3/12 (2006.01)

(52) U.S. Cl. .................. 717/170; 717/174; 709/220; 709/227; 358/1.13; 358/1.15

(58) Field of Classification Search ......... 717/168–178; 709/220, 227; 358/1.13, 1.15
See application file for complete search history.

(56) References Cited

U.S. PATENT DOCUMENTS

| | | | | |
|---|---|---|---|---|
| 5,826,015 A | * | 10/1998 | Schmidt | 726/23 |
| 6,381,741 B1 | * | 4/2002 | Shaw | 717/168 |
| 6,546,492 B1 | * | 4/2003 | Walker et al. | 726/3 |
| 6,557,054 B2 | * | 4/2003 | Reisman | 710/33 |
| 6,959,437 B2 | * | 10/2005 | Schacht et al. | 719/321 |
| 7,086,051 B2 | * | 8/2006 | Gautney | 717/176 |
| 7,146,412 B2 | * | 12/2006 | Turnbull | 709/220 |
| 7,313,791 B1 | * | 12/2007 | Chen et al. | 717/170 |
| 2003/0066066 A1 | * | 4/2003 | Nguyen et al. | 717/178 |
| 2004/0243994 A1 | * | 12/2004 | Nasu | 717/171 |

(Continued)

FOREIGN PATENT DOCUMENTS

JP 2000-316066 A 11/2000

(Continued)

OTHER PUBLICATIONS

A case study of dependable software upgrade with distributed components, Li, J.J.; Xueshan Shan, Computer Software and Applications Conference, 2002. COMPSAC 2002. Proceedings. 26th Annual, International, 2002, pp. 1028-1033.*

(Continued)

*Primary Examiner*—Wei Y Zhen
*Assistant Examiner*—Satish Rampuria
(74) *Attorney, Agent, or Firm*—Birch, Stewart, Kolasch & Birch, LLP (57) ABSTRACT

A user machine is made aware of a need for communication to update a version of a firmware by communication from a service center (a notification that the latest version has been released). After shutting off this communication once, communication is carried out between the official service center and the user machine by the user machine commencing communication with the official service center, the contact information of which is stored, and the service center provides information for updating the new version to the user machine in this communication state.

15 Claims, 3 Drawing Sheets

U.S. PATENT DOCUMENTS

2004/0268339 A1* 12/2004 Van Someren et al. ...... 717/172
2005/0210458 A1* 9/2005 Moriyama et al. .......... 717/168
2007/0006150 A9* 1/2007 Walmsley ................... 717/120

FOREIGN PATENT DOCUMENTS

| JP | 2001-14150 A | 1/2001 |
| JP | 2002-132368 A | 5/2002 |
| JP | 2002-366365 | 12/2002 |

OTHER PUBLICATIONS

A framework for live software upgrade, Lizhou Yu; Shoja, G.C.; Muller, H.A.; Srinivasan, A., Software Reliability Engineering, 2002. ISSRE 2002. Proceedings. 13th International Symposium on, 2002, IEEE, pp. 149-158.*

Upgradable distribution for broadband networks, Takano, J.; Tanaka, N.; Takasaki, Y., Communication Technology Proceedings, 2003. ICCT 2003. International Conference on, vol. 2 Apr. 9-11, 2003, IEEE, pp. 1472-1475 vol. 2.*

Upgrade planning for upgradable product design, Matsuda, A.; Shimomura, Y.; Kondoh, S.; Umeda, Y., Environmentally Conscious Design and Inverse Manufacturing, 2003. EcoDesign '03. 2003 3rd International, Symposium on, Dec. 8-11, 2003, IEEE, pp. 231-234.*

* cited by examiner

COMMUNICATION METHOD AND COMMUNICATION SYSTEM, AND INFORMATION RECEIVING DEVICE USED IN THE COMMUNICATION SYSTEM

CROSS REFERENCE TO RELATED APPLICATIONS

This application claims priority under 35 U.S.C. § 119(a) on Patent Application No. 2004-36925 filed in Japan on Feb. 13, 2004, the entire contents of which are hereby incorporated by reference.

BACKGROUND OF THE INVENTION

1. Field of the Invention

The present invention relates to communication systems set up between a "user machine", which is a device such as an image forming device provided with a facsimile function, for example, and a "service center", methods for communicating across that communication system, and information receiving devices (the above-noted user machine) used in the communication system. In particular, the present invention relates to measures for improving security in cases such as when firmware in the user machine is updated in response to a notification from the service center, or various settings in the user machine are changed by remote operation from the service center.

2. Description of the Related Art

Multifunction units that contain functions such as a copy function, printer function and facsimile function have been in mainstream use for some time. This type of multifunction unit is set up such that the control operation of various functions is performed by control software (micro program) called "firmware" that is written onto ROM (read only memory) assembled in the hardware, or onto EEPROM (electrically erasable programmable read only memory).

However, in this type of device, if, for example, bugs are found in the firmware, then it becomes necessary to update the version of the firmware (update to a version that does not contain bugs). Up to now, it has been standard practice that new versions of firmware are updated by a maintenance operator going out to the installed location of the multifunction unit to replace the ROM or download the appropriate data from an IC card or host interface.

However, there have been problems in that when the maintenance operator goes out to the installed location of the multifunction unit every time there is a new version of the firmware, it is necessary to expend a great deal of time and energy to update the firmware in all the numerous multifunction units. Not only is it not been possible to perform updating of the new version quickly but the cost of maintenance has escalated.

Furthermore, not only is the case in which versions of the firmware are updated, but also in the case of changes to various settings of the multifunction unit in response to user requests (for example, setting of modes such as an energy saving mode or 2-in-1 copy function), the maintenance operator actually goes out to the installed locations of the multifunction units to change the settings, and this has caused an escalation in maintenance costs.

As a solution to these problems, the technology disclosed in JP 2000-316066A (referred to below as Patent Reference 1) has been proposed. In Patent Reference 1, technology is disclosed in which the facsimile function of the multifunction unit is utilized to communicate between the multifunction unit and the service center, in order to transmit the firmware's updated version or setting change information from the service center to the multifunction unit, and then to update the firmware or change the various settings based on this information.

The operation for updating the version of the firmware that is disclosed in Patent Reference 1 is set up such that, first of all, the data received from outside via the communication line is judged as to whether or not it is the data for upgrading the firmware, and if the data is the data for upgrading the firmware, then while still connected, the data is temporarily saved in the RAM (random access memory), and after the reception is complete, the firmware is updated utilizing the data that was temporarily saved in the RAM.

However, in the technology disclosed in Patent Reference 1, if data that is disguised as data for upgrading the firmware is sent to the multifunction unit from a party that is not the official service center, then there is a risk that the multifunction unit will judge that data to be the official data for upgrading the firmware, and will then update the firmware utilizing that data. In this case, if a computer virus is contained in the received data for upgrading the firmware, then the firmware will be infected with a virus and will not be able to perform its normal functions. That is to say, if a malicious party who is disguised as the official service center transmits data containing a computer virus, then it is not possible to prevent viral infection.

Furthermore, if the data that is transmitted by a malicious party who is disguised as the official service center is a program for improperly accessing information accumulated in the multifunction unit, then there is a risk that information such as personal information (customer information) registered in the multifunction unit, or information such as the send/receive log of the facsimile, may be improperly accessed.

Thus, conventional technology for updating versions of firmware on a user machine by transmitting between a user machine, such as a multifunction unit, and a service center has not employed defensive measures against viral infections or theft of accumulated information, and has had an exceptionally low level of security.

The present invention has been contrived in view of these points, and it is an object of the present invention to provide a highly secure communication system, a communication method that is performed on that communication system and an information receiving device in which the communication system is used, for updating versions of the firmware by communication between the user machine and the service center, and for being able to avoid with certainty viral infections or theft of accumulated information, caused by data from a party which is not the official service center.

SUMMARY OF THE INVENTION

Summary of the Invention

When a solution means of the present invention assembled for achieving the above-noted object updates a version of a firmware of the user machine, or changes settings on the user machine, first of all, the solution means communicates with the service center (for example, communication such as notification that the latest version has been released). Thus, the user machine is made aware of the need to communicate for updating the version of the firmware, or changing settings. Then, after shutting off this communication once, and then confirming that communication is carried out between the official service center and the user machine by the user machine commencing communication with the official service center, the information of the new version or information of the renewed settings is provided from the service center to the user machine in this communication state. That is to say, the solution means is arranged so that viral infections or information leaks caused by information from a party who is not the official service center do not occur.

Solution Means

More specifically, the present invention is a communication method, executed on a communication system which is constructed of an information providing device that has a communication function and an information receiving device that has a communication function, wherein the communication system is configured such that information is provided from the information providing device to the information receiving device. As the communication method, first of all, a first communication operation is performed in which the information receiving device communicates in response to an external call, after which a severing operation is performed to cut the communication once. After this, a second communication operation is performed in which communication is carried out between the information providing device and the information receiving device by the information receiving device calling the information providing device using information providing device information that is stored and saved in advance in the information receiving device, and wherein in the second communication operation, information is provided from the information providing device to the information receiving device.

Furthermore, the following may be given as an example of a configuration of the communication system for executing the communication method. First of all, it is taken as a precondition that the communication system is constructed of an information providing device that has a communication function and an information receiving device that has a communication function, wherein the communication system is configured such that information is provided from the information providing device to the information receiving device. The information receiving device of the communication system is provided with a memory portion in which information about the information providing device is stored in advance. The communication system is arranged such that after the information receiving device has performed a first communication operation in response to an external call, the communication system performs a severing operation to cut the communication once. The communication system is configured such that after this, a second communication operation, in which communication is carried out between the information providing device and the information receiving device by the information receiving device calling the information providing device using the information providing device information, and wherein in the second communication operation, information is provided from the information providing device to the information receiving device.

As noted above, in the present invention, the communication system is set up so that when updating a version of the firmware or changing the settings, for example, first, after communication from the information providing device, this communication is broken once, and then communication commences from the information receiving device to the official information providing device, and the information receiving device receives the new version information or the like in that communication state. Thus, it is possible to be certain that the information receiving device definitely receives information such as the new version information from the official information providing device. As a result, viral infections or information leaks caused by information from parties that are not the official information providing apparatus do not occur, and it is possible to achieve a highly secure communication state.

More specifically, when it is necessary to update a version of the firmware or change the settings of the information receiving device due to these specific items of the present invention, first, a first communication operation is performed in which the information receiving device communicates in response to a call from the information providing device. Thus, the information receiving device recognizes the need to update the version of its own firmware, or to change its settings, and after this, the information receiving device cuts the communication once. Information about the information providing device (for example, the dial number of the information providing device) is stored and saved in the information receiving device in advance. Thus, if the information receiving device calls the information providing device using this information providing device information (the second communication operation), then it is possible to reliably communicate with the official information providing device. Information (such as the new version of the firmware or information on setting changes) is provided from the information providing device to the information receiving device in this state, and processes are executed in the information receiving device according to this information. For example, even if the first communication operation is started by a malicious third party who is disguised as the official information providing device (for example, the service center), then because this communication is cut once, and the second communication operation is carried out by a call from the information receiving device, there is no communication with the malicious party, and computer virus infection or information leaks caused by the malicious party do not occur. Thus it is possible to realize a highly secure communication state.

The information provided from the information providing device to the information receiving device in the second communication operation is information about a new version of the firmware, and the information receiving device may be configured such that after it receives this information about a new version of the firmware, the information receiving device overwrites the firmware based on that information.

Thus, the firmware is overwritten after the entire new version of the firmware is received. If, for example, the receiving operation of the new version of the firmware (the second communication operation), and the overwriting operation of the firmware were carried out simultaneously, then if an error were to occur during the second communication operation (problems due to power loss or noise), then the firmware would be in an uncompleted state, and there is a possibility that recovery would be impossible. In the present solution means, since the firmware is overwritten after the new version of the firmware has been completely received, then even if a communication error occurs, it is possible to retain the previous firmware version, and it is possible to realize a highly robust operation for updating the firmware to a new version.

The following is also an example of a configuration for ensuring that the device that calls the information providing device in the second communication operation is actually the official information receiving device. That is to say, the information providing device notifies the information receiving device of a password in the first communication operation. Then, the information receiving device may be configured to return the password to the information providing device during the second communication operation (for example, when starting the second communication operation). Thus, if the device that calls the information providing device, for example, at the start of the second communication operation, is the official information receiving device, then the information providing device receives the password that it transmitted to the information receiving device itself in the first communication operation. Thus, the information transmitting advice can recognize that the second communication operation has commenced with the official information receiving device. That is to say, it is possible to prevent the information providing device from misjudging or mis-operating due to fake data (such as fake orders, service calls, print records and version upgrade records) from devices disguised as the official information receiving device). Thus, combined with the action of the solution means, both the devices are able to be aware that communication is taking place between the official information providing device and the official information receiving device, and it is possible to realize an exceptionally secure communication state.

That is to say, with the present invention, the communication system is configured such that in the first communication operation, which is the call from the information providing device, the password is notified to the information receiving device, and the password is returned to the information providing device in the second communication operation, which is a call from the information receiving device. Thus, the information providing device can be aware that the second communication operation has started with the official information receiving device. That is to say, it is possible to prevent the information providing device from misjudging or mis-operating due to false data from a device that is disguised as the official information receiving device, and thus higher security may be obtained.

Furthermore, the password that is notified from the information providing device to the information receiving device may be configured so that it is invalid after a predetermined time interval after the first communication operation is cut. Thus, even if the password is leaked, there is a high possibility that it can be invalidated before it can be used maliciously, and it is possible to improve the reliability of the system.

Moreover, the password that is notified from the information providing device to the information receiving device in the first communication operation, may also be configured so as to become invalid once the operation to provide the information from the information providing device to the information receiving device is complete. Thus, once the correct communication (the second communication operation using the password) is complete, the password becomes unnecessary. Thus, by invalidating the password, it is possible to avoid a situation in which a third party maliciously uses the password.

Furthermore, when the operation to overwrite the firmware based on the information received is complete, the information receiving device may be configured so as to notify that fact to the information providing device. Thus, the information providing device can be aware that the new version of the firmware is valid in the information providing device (for example, that the firmware has been overwritten to the latest version). That is to say, by the information providing device receiving the "completed" information, the information providing device is able to ascertain that it is not necessary to re-transmit the new version of the firmware. Put another way, if the information providing device is not notified of the "completed" information, then there is a possibility that a communication error occurred during the second communication operation (for example, problems due to a loss of power or due to noise), the information providing device can easily ascertain that the new version of the firmware may need to be re-transmitted, and thus it is possible to construct a highly reliable system.

It should be noted that a firmware recording region in the information receiving device is provided with a region that the firmware overwriting operation that is based on the information that is received is prohibited to overwrite. This region is a region into which even if overwriting of the firmware fails due to a communication error, or the data is accidentally overwritten, for example, then a request for, or information for carrying out another version update can be written. By making this region unchangeable, a situation in which the information receiving device cannot be started can be avoided, and thus a highly reliable system may be constructed.

Furthermore, an information receiving device (user machine) in which the communication system according to the above-noted solution means is used is within the technical scope and spirit of the present invention. That is to say, the present invention may also be the information receiving device in which the information provided from the information providing device in the second communication operation is information about a new version of the firmware, and wherein the information receiving device is provided with information saving means for temporarily saving the information about the new version of the firmware that was received, and overwriting means for extracting the new version information saved by the information saving means to overwrite the firmware.

DESCRIPTION OF THE PREFERRED EMBODIMENTS

Hereinafter, embodiments of the present invention will be described with reference to the accompanying drawings. In the present embodiment, the present invention is described with regard to its application in a communication system constructed between a multifunction unit, which is a user machine (known in the present invention as an "information receiving device") that is provided with a copy function, a printer function and a facsimile function, and a service center (known in the present invention as an "information providing device"), which is the maintenance contractor of this multifunction unit.

-Description of the Compound Machine-

First is a description of the multifunction unit, which is the image forming device, and which is the machine used on the user side of the present communication system.

Figure 1:
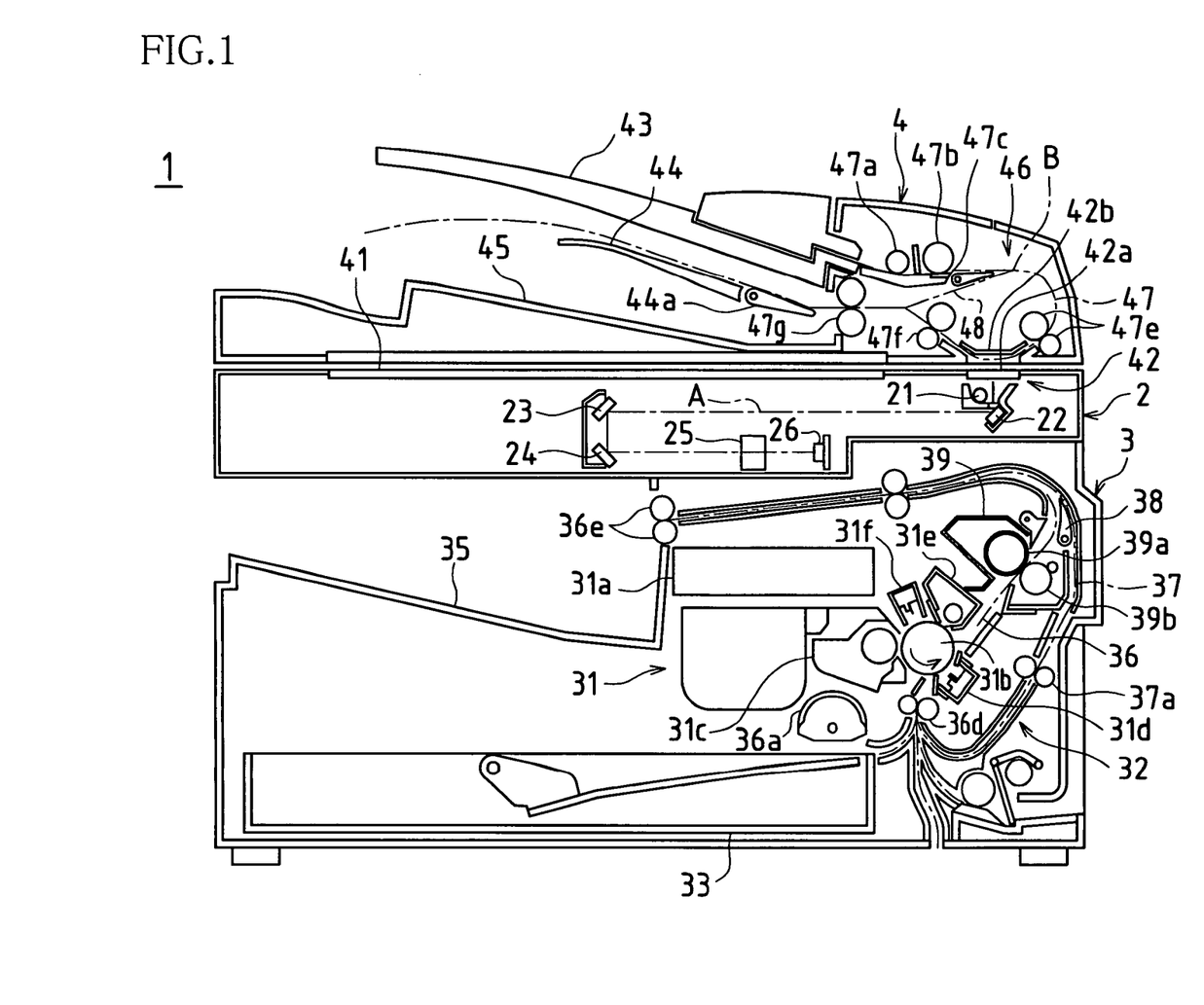
FIG. 1 is a diagram schematically showing an outline of the internal structure of the multifunction unit according to an embodiment.

FIG. 1 schematically shows an internal structure of a multifunction unit 1 according to the present embodiment. As shown in FIG. 1, the multifunction unit 1 has a scanner portion 2 as a manuscript reading portion, a print portion 3 as an image forming portion and an automatic manuscript paper supply portion 4. These parts are described in the following.

<Description of the Scanner Portion 2>

The scanner portion 2 is a part for reading in the image of manuscripts that are placed on a manuscript table 41 that is made of transparent glass, or the like, or the image of manuscripts that are supplied page by page from the automatic manuscript paper supply portion 4 and for creating image data. The scanner portion 2 is provided with an exposure light source 21, a plurality of reflecting mirrors 22, 23 and 24, an imaging lens 25 and a photoelectric transducer (CCD: charge coupled device) 26.

The exposure light source 21 is a device for irradiating light onto the manuscript that is placed on the manuscript table 41 of the automatic manuscript paper supply portion 4 or manuscripts carried by the automatic manuscript paper supply portion 4. As shown by the dotted line A in FIG. 1, the reflective mirrors 22, 23 and 24 are set so as to first reflect the light that is reflected from the manuscript to the left of the diagram, after which they reflect the light downward, and after which they then reflect the light rightward toward the imaging lens 25.

As the operation to read the image of the manuscript, if the manuscript is placed on the manuscript table 41 (if used in the "stationary sheet mode"), then the exposure light source 21 and the reflective mirrors 22, 23 and 24 horizontally scan the manuscript table 41 to read in the image of the entire manuscript. On the other hand, if reading in a manuscript that is carried by the automatic manuscript paper supply portion 4 (if used in the "moving sheet mode"), then the exposure light source 21 and the reflective mirrors 22, 23 and 24 are fixed in the position shown in FIG. 1, and the image of the manuscript is read in when the manuscript reading portion 42 of the automatic manuscript paper supply portion 4, which will be explained as follows, passes the manuscript.

Light that is reflected by the reflecting mirrors 22, 23 and 24 to pass through the imaging lens 25 is guided to the photoelectric transducer 26, and the reflected light is converted to an electrical signal (manuscript image data) by the photoelectric transducer 26.

<Description of the Print Portion 3>

The print portion 3 is provided with an image forming system 31 and a paper transport system 32.

The image forming system 31 is provided with a laser scanning unit 31a and a photosensitive drum 31b as a drum-type image transport body. The laser scanning unit 31a is a device for irradiating laser light onto the surface of the photosensitive drum 31b in accordance with manuscript image data that is converted by the photoelectric transducer 26. The photosensitive drum 31b rotates in the direction of the arrow shown in FIG. 1, and a latent electrostatic image is formed on its surface by laser light irradiated from the laser scanning unit 31a.

Furthermore, in addition to the laser scanning unit 31a, a developing device (developing mechanism) 31c, a transfer unit (transfer mechanism) 31d, a cleaning device (cleaning mechanism) 31e, an unshown de-electrifier and a charging unit 31f are circumferentially arranged in order around the periphery of the photosensitive drum 31b. The developing device 31c is a device for using toner (a substance for forming a manifest image) to develop the latent electrostatic image formed on the surface of the photosensitive drum into a visible image. The transfer unit 31d transfers the toner image formed on the surface of the photosensitive drum 31b onto a piece of image forming paper, which is a recording medium. The cleaning device 31e is set so as to remove toner residual on the surface of the photosensitive drum 31b after transfer of toner. The de-electrifier removes the residual electric charge from the surface of the photosensitive drum 31b. The charging unit 31f is set so as to provide a predetermined electric potential to the surface of the photosensitive drum before the latent image is formed.

Thus, when forming an image on the image forming paper, the surface of the photosensitive drum is charged to a predetermined electric potential by the charging unit 31f, and then the laser scanning unit 31a irradiates laser light onto the surface of the photosensitive drum 31b based on the manuscript image data. After this, the developing device 31c uses toner to develop a visible image on the surface of the photosensitive drum 31b, and the toner image is transferred to image forming paper by the transfer unit 31d. Further still, after this, the cleaning device 31e removes the toner residual on the surface of the photosensitive drum 31b and the de-electrifier removes the electric charge residual on the surface of the photosensitive drum 31b. Thus, one cycle of the operation to form an image on the image forming paper (printing operation) is complete. By repeating this cycle, it is possible to continuously form images with respect to a plurality of pieces of image forming paper.

On the other hand, the paper transport system 32 carries image forming paper contained in a paper cassette 33, which is a paper containment portion, sheet by sheet to form images according to the image forming system 31, and it discharges the image forming paper on which an image has been formed to a discharge tray, which is a paper discharge portion.

The paper transport system 32 is provided with a principal transport path 36 and a reverse transport path 37. One end of the principal transport path 36 faces the discharge side of the paper cassette 33, while the other end is faces a discharge tray 35. One end of the reverse transport path 37 is upstream (below, in the drawing) of the arranged position of the transfer unit 31d and is connected to the principal transport path 36, and the other end is downstream (above, in the drawing) of the arranged position of the transfer unit 31d and is connected to the principal transport path 36.

The upstream end of the principal transport path 36 (the part facing the discharge side of the paper cassette 33) is provided with a pickup roller 36a whose cross-section is semicircular. Image forming paper contained in the paper cassette 33 can be intermittently supplied page by page into the principal transport path 36 by rotating the pickup roller 36a.

Register rollers 36d are arranged in the principal transport path 36 on the upstream side of the transfer unit 31d. The register rollers 36d are rollers for matching the position of the toner image on the surface of the photosensitive drum 31b to the image forming paper while transporting the image forming paper. A fixing device 39 that is provided with a pair of fixing rollers 39a and 39b for using heat to fix the toner image that is transferred to the image forming paper, is arranged in the principal transport path on the downstream side of the arranged position of the transfer unit 31d. Moreover, discharge rollers 36e for discharging the image forming paper to the discharge tray 35 is arranged at the downstream end of the principal transport path 36.

A branch catch 38 is arranged at the position at which the upstream end of the reverse transport path 37 connects to the principal transport path 36. The branch catch 38 is rotatable around a horizontal axis between a first position, which is shown by a solid line in FIG. 1, and, rotating in a counter clockwise direction in the drawing from the first position, a second position opening the reverse transport path 37. When the branch catch 38 is in the first position, the image forming paper is carried toward the discharge tray 35, and when it is in the second position, the image forming paper can be delivered into the reverse transport path 37. Transport rollers 37a are arranged in the reverse transport path 37, and the paper transport system 32 is arranged such that if the image forming paper is delivered into the reverse transport path 37 (if the image forming paper is fed into the reverse transport path 37 by what is known as "switchback transport"), then the image forming paper is transported by the transport rollers 37a and the image forming paper is reversed on the upstream side of the register roller 36d, and is again carried along the principal transport path 36 toward the transfer unit 31d. That is to say, it is handled such that an image may be formed on the back side of the image forming paper.

<Description of the Automatic Document Paper Supply Portion 4>

The following is a description of the automatic manuscript paper supply portion 4. The automatic manuscript paper supply portion 4 is configured as what is known as an automatic two-sided manuscript transport device. The automatic manuscript paper supply portion 4 can be used for a sheet moving mode and is provided with a manuscript tray 43 as a manuscript placement portion, a middle tray 44, a manuscript discharge tray 45 as a manuscript discharge portion, and a manuscript transport system 46 that transports manuscripts between the trays 43, 44, and 45.

The manuscript transport system 46 is provided with a main transport path 47 for transporting manuscripts placed on the manuscript tray 43 to the middle tray 44 via the manuscript reading portion 42 or the manuscript discharge tray 45, and a secondary transport path 48 for supplying manuscripts on the middle tray 44 to the main transport path 47.

A manuscript pickup roller 47a and a stacking roller 47b are arranged at an upstream end (a portion facing the discharge side of the manuscript tray 43) of the main transport path 47. A stacking board 47c is arranged below the stacking roller 47b and, due to the rotation of the manuscript pickup roller 47a, one sheet of the manuscripts on the manuscript tray 43 passes between the stacking roller 47b and the stacking board 47c such that it is supplied to the main transport path 47. PS rollers 47e are arranged on a side lower than the linking area between the main transport path 47 and the secondary transport path 48 (area B in the drawing). The PS rollers 47e regulate the leading edge of the manuscript and the image reading timing of the scanner portion 2 to supply manuscripts to the manuscript reading portion 42. That is, the PS rollers 47e temporarily stop the transport of the manuscript in the state in which the manuscript was supplied, and regulate the image reading timing so as to supply manuscripts to the manuscript reading portion 42.

The manuscript reading portion 42 is provided with a platen glass 42a and a manuscript pressing board 42b and, when a manuscript supplied from the PS rollers 47e passes through between the platen glass 42a and the manuscript pressing board 42b, light from the above-mentioned exposure light source 21 passes through the platen glass 42a and is irradiated on the manuscript. At this juncture, manuscript image data is obtained by the above-mentioned scanner portion 2. A biasing force is applied to the back surface (top surface) of the manuscript pressing board 42b by an unshown coil spring. In this way, the manuscript pressing board 42b makes contact against the platen glass 42a with a predetermined suppressing force, thus preventing the manuscript from rising up from the platen glass 42a when the manuscript passes through the manuscript reading portion 42.

Transport rollers 47f and manuscript discharge rollers 47g are provided on a downstream side of the platen glass 42a. A manuscript that passes over the platen glass 42a is discharged to the middle tray 44 or the manuscript discharge tray 45 via the transport rollers 47f and the manuscript discharge rollers 47g.

A middle tray swinging board 44a is arranged between the manuscript discharge rollers 47g and the middle tray 44. The middle tray swinging board 44a has its swinging center at an edge area of the middle tray 44 and is able to swing between a position 1 shown in the drawing by a solid line and a position 2 in which it is raised upwards from the position 1. When the middle tray swinging board 44a is in the position 2, a manuscript discharged from the manuscript discharge rollers 47g is withdrawn to the manuscript discharge tray 45. On the other hand, when the middle tray swinging board 44a is in the position 1, a manuscript discharged from the manuscript discharge rollers 47g is discharged to the middle tray 44. When a manuscript is discharged to the middle tray 44, an edge of the manuscript is sandwiched between the manuscript discharge rollers 47g, and by reversing the rotation of the manuscript discharge rollers 47g while in this condition, the manuscript is supplied to the secondary transport path 48 and is again dispatched to the main transport path 47 via the secondary transport path 48. The operation of reversing the rotation of the manuscript discharge rollers 47g is carried out by regulating the dispatch of the manuscript to the main transport path 47 and the timing of image reading. In this way, an image on the reverse side of a manuscript can be read by the manuscript reading portion 42.

Control Block

Figure 2:
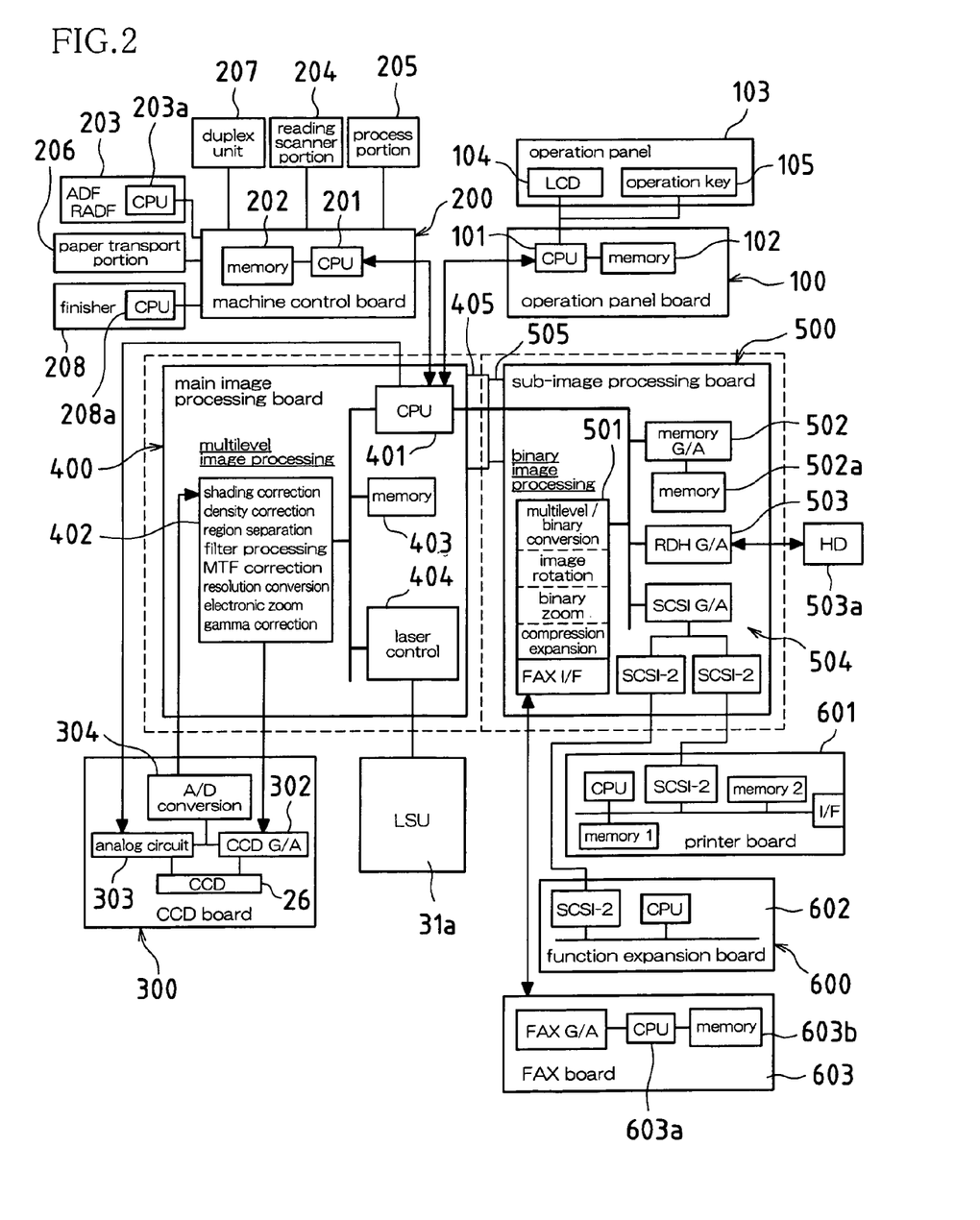
FIG. 2 is a block diagram showing the principal structural elements that constitute the multifunction unit, such as various unit portions and image processing portions.

FIG. 2 is a block diagram showing the principal structural components of the various unit portions and image processing portion, for example, that constitute the multifunction unit 1 according to the present invention. In the diagram, a main central processing unit 401 (CPU) that is positioned substantially in the center controls the operation of the multifunction unit 1 while connecting to sub central processing units contained within the unit portions.

As can be understood from FIG. 2, the multifunction unit 1 is principally constituted by boards such as an operation panel board 100 for controlling an operation panel 103, positioned in substantially the upper right of the diagram, a machine control board 200 for controlling the units that constitute the multifunction unit, positioned in substantially the upper left of the diagram, a CCD board 300 for electrically reading in the manuscript image and converting it to electronic data, positioned in substantially the lower left of the diagram, a main image processing board 400 for image processing the manuscript image that was digitized by the CCD board 300, in a predetermined manner, positioned in substantially the center of the diagram, a sub-image processing board 500 for further image processing the image information that was processed by the main image processing board 400, in a predetermined manner, and also, an expansion board group 600 (printer board 601, function expansion board 602 and fax board 603) connected to the sub-image processing board 500 via an interface, positioned in substantially the lower right of the diagram.

Next, the manner in which the above-noted boards perform the control is described for each board.

Operation Panel Board 100

The operation panel board 100 is basically controlled by the sub central control unit (CPU) 101, and it manages a display screen of an LCD 104 that is arranged on the operation panel 103, and operational input from an operation key group 105 for inputting commands relating to various modes, for example. Furthermore, the operation panel board 100 is also provided with a memory 102 for storing various pieces of control information for the operation panel 103, such as data input from the operation key group 105 and information displayed on the LCD 104.

In the operation panel board 100 having the above-noted configuration, the sub central processing unit (CPU) 101 exchanges control data for controlling the parts of the multi-function unit 1 with the main central processing unit (CPU) 401, and directs operations of the various parts of the multi-function unit 1. Furthermore, the main central processing unit (CPU) 401 forwards control signals that indicate the operational state of the multifunction unit 1 to the sub central processing unit (CPU) 101. The LCD 104 on the operation panel 103 indicates the operational state of the multifunction unit 1 by this control signal.

Machine Control Board 200

The machine control board 200 is completely controlled by a sub central processing unit (CPU) 201, and it manages for example, an automatic manuscript carrying device 203 such as an ADF or RADF, a reading scanner portion 204 for reading in the manuscript image, a process portion 205 for recreating the image data into an image, a paper transport portion 206 for transporting paper onto which the image is recorded, in sequence, from the containment portion toward the process portion 205, a duplex unit 207 for reversing paper onto which an image has been formed and for carrying the paper in reverse such that an image is formed on both sides of the paper, and a finisher 208 for after-processing such as stapling the paper on which the image is recorded.

CCD Board 300

The CCD board 300 is constituted by devices such as the CCD 26 for electrically reading the manuscript image (see FIG. 1), a circuit (CCD display) 302 for driving the CCD 26, an analog circuit 303 for adjusting the gain and the like of an analog signal output from the CCD 26 and an A/D converter 304 for converting the analog output of the CCD 26 to a digital signal to output the digital signal as image data, and is controlled by the main central processing unit 401.

Main Image Processing Board 400

The main image processing board 400 is controlled by the main central processing unit 401, and is constituted by parts such as a multilevel image processing portion 402 for carrying out multilevel image data processing such as shading correction, density correction, region separation, filtering, MTF correction, resolution conversion, electronic zoom (magnifying) and gamma correction, so as to be able to express a desired image gray scale in the image data of the manuscript image sent from the CCD board 300, a memory portion 403 for storing various control information such as the image data that is processed or the management of the process sequence, and a laser control 404 for forwarding the image data to a laser scanning unit (LSU) 31a for reproducing the image from the processed image data, as well as for controlling the LSU 31a.

Sub-Image Processing Board 500

The sub-image processing board 500 is connected by a connector to the main image processing board 400, and is constituted by parts such as a binary image processing portion 501 that is controlled by the main central processing unit 401 on the main processing board 400, a memory 502a for managing the storage of data such as processed binary image data or control data used in the process and a memory G/A (gate array) 502 for controlling the memory 502a thereof, a hard disk (HD) 503a for managing the storage of the image data of a plurality of pages of manuscripts, for repeating the plurality of images of the manuscript to read out only the number desired and for creating a plurality of copies, and a RDH G/A 503 for controlling the HD 503a, and a SCSI-2, which is an external interface and a SCSI G/A 504 for controlling the SCSI-2.

Furthermore, the above-noted binary image processing portion 501 is constituted by parts such as a processing portion for converting multilevel image data to binary image data, a processing portion for rotating images and a binary zoom processing portion for zooming the binary image, and still further, a fax interface that is capable of transmitting and receiving a fax image via communication means is also provided.

Expansion Board 600

For the expansion board, there are boards such as a printer board 601 to output data that has been sent from a personal computer, or the like, from the process portion 205 as a printer mode, a function expansion board 602 for expanding the editing functions to effectively utilize the characteristics of the multifunction unit and a FAX board 603 for transmitting the image of a manuscript that is read in from the reading scanner portion 204 to a destination, as well as to output image data sent from a destination through the process portion 205.

The following is a description of the image data process and flow that occurs in the copy, fax and print modes, as processing operations of a multifunction unit 1 that is configured in such a manner (see FIG. 1 and FIG. 2).

Copy Mode

A manuscript that is set on the automatic manuscript paper supply portion 4 of the multifunction unit 1 is delivered in order sheet by sheet, the image of the manuscript is read in sequentially by the scanner portion 2 that was described previously, and forwarded to the main image processing board 400 as 8-bit electronic data.

The 8-bit electronic data that is forwarded to the main image processing board 400 undergoes a predetermined process in the multilevel image processing portion 402 as 8-bit electronic image data.

The 8-bit electronic image data undergoes processing such as gamma correction and is sent to the LSU 31a via the laser control portion 404.

Thus, the manuscript image read by the scanner portion 2 of the multifunction unit 1 is output from the print portion 3 as a tonal copy image.

Electronic RDH Function in Copy Mode

In a similar manner, a manuscript that is set on the automatic manuscript paper supply portion 4 of the multifunction unit 1 is delivered in order sheet by sheet, the image of the manuscript is read in sequentially by the scanner portion 2 that was previously described, and forwarded to the main image processing board 400 as 8-bit electronic data.

The 8-bit electronic data that is forwarded to the main image processing board 400 undergoes a predetermined process in the multilevel image processing portion 402 as 8-bit electronic image data.

Then, this 8-bit electronic image data is sent from the connector 405 on the main image processing board 400 to the sub-image processing board 500 via a connector 505 on the sub-image processing board 500, and is converted from 8-bit electronic image data to 2-bit electronic image data while undergoing processes such as error scattering by a multilevel/binary converting portion of the binary image processing portion 501.

It should be noted that with conversion of the 2-bit electronic image data that includes processing such as error scattering of the 8-bit electronic image data, there are no image quality problems caused simply by multilevel to binary conversion and thus this is considered so as to reduce the degradation of image quality.

Furthermore, the conversion of 8-bit electronic image data to 2-bit electronic image data is performed with consideration to the size of the stored image.

For 2-bit electronic image data that is converted in this way, each page of the manuscript is forwarded to a disk memory such as the HD 503*a* and is temporarily stored.

When the manuscript group set on the automatic manuscript paper supply portion 4 of the multifunction unit 1 has all been read, the 2-bit data that was temporarily stored previously in the HD 503*a* is repeatedly read out for the number of copies specified by control of the gate array, and the 2-bit electronic data that was read out is again sent to the main image processing board 400 via the connector portions 505 and 405, the 2-bit electronic image data undergoes processing such as gamma correction and is then sent to the LSU 31*a* via the laser control 404.

It should be noted that the multifunction unit 1 of the present embodiment is described such that the desired number of copies of the image group is read out repeatedly only after the entire manuscript image group has been read in, however the multifunction unit 1 may also be configured such that output of the fist copy occurs at the stage at which a predetermined percentage of the images have been prepared.

Thus, the image of the manuscript read in by the scanner portion 2 of the multifunction unit can be output from the print portion 3 as a tonal copied image.

Printer Mode

Images sent from external devices that are connected through a network, such as a personal computer, are expanded on the board 601 as discrete page images on the printer board 601, after which they are temporarily forwarded from the SCSI 504, which is an interface, to the sub-image processing board 500, and are then stored in disk memory such as the HD 503*a*.

It should be noted that the images expanded on the printer board 601 as page images are sent to the sub-image processing board 500, but they are simply temporarily recorded on the HD 503*a* without undergoing binary image processing.

The temporarily stored page images also do not undergo binary image processing when they are read out from the HD 503*a*.

The image information temporarily stored on the HD 503*a* is read out from the HD 503*a* to give the predetermined page order, while being sent to the main image processing board 400 for gamma correction, and writing of the image is controlled from the laser control 404 such that the image is reproduced by the LSU 31*a*.

Fax Mode

Fax mode is for transmitting manuscripts to another party, or for receiving manuscripts from another party.

Describing first a case in which a manuscript is transmitted to another party, a transmitting manuscript set on the automatic manuscript paper supply portion 4 of the multifunction unit 1 is delivered in order page by page, the transmitting manuscript is read in in order by the scanner 2, configured as previously described, and is forwarded to the main image processing board 400 as 8-bit electronic data.

The 8-bit electronic data forwarded to the main image processing board 400 is processed in a predetermined manner in the multilevel image processing portion 402 as 8-bit electronic image data.

Then, this 8-bit electronic image data is next sent from the connector 405 of the main image processing board 400 to the sub-image processing board 500 through the connector 505 of the sub-image processing board 500, and is converted from 8-bit electronic image data to 2-bit electronic image data while undergoing processing such as error dispersion in the multilevel/binary conversion portion of the binary image processing portion 501.

It should be noted that with conversion of the 2-bit electronic image data that includes processing such as error scattering of the 8-bit electronic image data, there are no image quality problems caused simply by multilevel/binary conversion and thus this is performed with consideration to reducing the degradation of image quality.

A transmitting manuscript that is converted to such a binary image is compressed to a predetermined format and stored in the memory 502*a*.

Then, when preparations for transmission to the other party are carried out and a transmission capable state is confirmed, the image of the transmitting manuscript that is read out from the memory 502*a* and compressed into a predetermined format is forwarded to the fax board 603, any necessary changes to the compression format or the like, are carried out in the fax board 603, and the image of the transmitting manuscript is transmitted in sequence to the other party via a communication line.

Next, a case in which a manuscript image is transmittably received from another party is described.

When a manuscript is transmittably received via a communication line from another party, as well as receiving the manuscript image transmitted from the other party while the communication preparations are performed at the fax board 603, the image that is received in a predetermined compressed format is sent from a fax interface provided in the binary image processing portion 501 of the sub-image processing board 500 to the binary image processing portion 501, and the manuscript image that was transmittably received is reproduced as a page image by a compression and expansion processing portion.

Then, the manuscript image that is reproduced as the image of a discrete page is forwarded to the main image processing board 400 to undergo gamma correction, and writing of the image is controlled from the laser control 404 such that the image is reproduced by the LSU 31*a*.

Configuration and Operation for Updating a Version of the Firmware

The following is a description of a configuration and operation for updating a version of the firmware in the multifunction unit 1, which is the part that is characteristic of the present embodiment. This "firmware version update" is an operation that is necessary for updating a bug-less version in cases in which, for example, a bug is found in the firmware. The firmware is contained in the machine control board 200, for example, and thus the contained firmware is updated to the latest version by being overwritten, based on information received from the service center.

One of the characteristics of the present multifunction unit 1 is that the dial number (phone number or fax number) of the service center of the multifunction unit 1 is stored and saved in advance in a memory (referred to as a memory portion in the present invention) of the fax board 603.

Furthermore, a CPU 603*a* that is provided on the FAX board 603 is provided with a function such that when a line is connected in response to an external call from a service center, for example, and communication is performed (referred to in the present invention as a first communication operation), if the information notified by this communication is a notification about a release of a new version of the firmware, then after this, the CPU cuts the communication once (referred to in the present invention as a severance operation).

Then, after this, the multifunction unit 1 is set up to dial the number of the service center that is stored and saved in a memory 603b of the FAX board 603, and to call the service center (referred to in the present invention as a second communication operation). It should be noted that the first communication operation is arranged such that the multifunction unit 1 is notified of a password (a password for use in the second communication operation) from the service center, and in the second communication operation, the multifunction unit 1 is arranged so as to return this password to the service center in response to a call from the service center.

Figure 3:
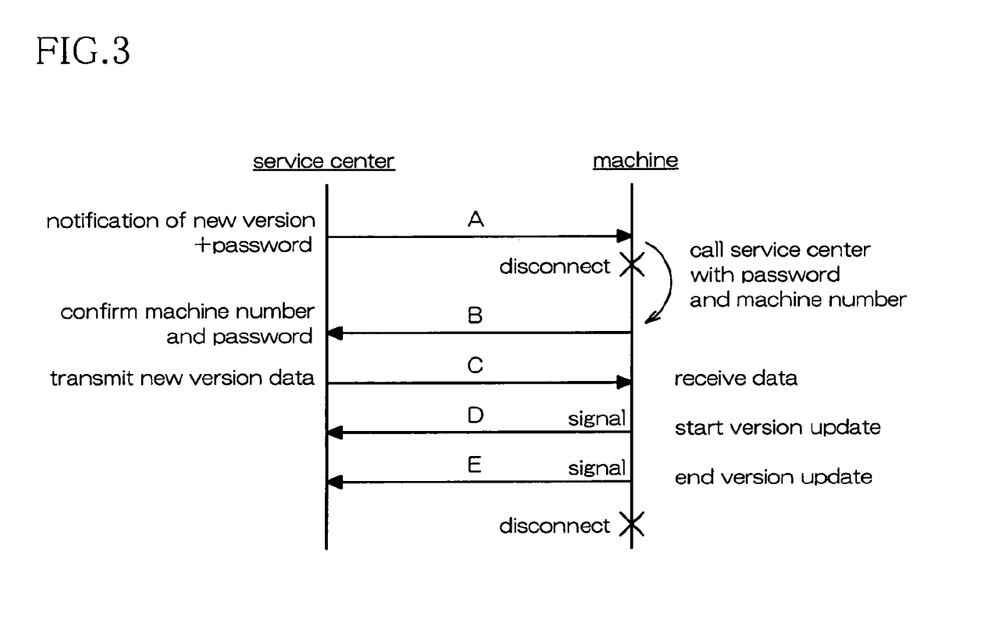
FIG. 3 is a diagram showing an operational procedure for updating a version of the firmware of the multifunction unit.

FIG. 3 is a diagram showing an operational sequence for updating a version of the firmware of the multifunction unit 1. The following is a description of the sequence for updating a version of the firmware according to FIG. 3.

First of all, the first communication operation is carried out to notify the multifunction unit 1 that the latest version has been released (communication state A in FIG. 3). The first communication operation is started by the service center dialing the FAX number of the multifunction unit 1. That is to say that the multifunction unit 1 obtains the release information from the service center by using the facsimile function of the multifunction unit 1. The multifunction unit 1 is notified of the password at this time as well. Thus, as well as confirming the necessity to update the version of its own firmware, the multifunction unit 1 confirms the communication password for updating this version. For example, this password may be stored in the memory 603b of the FAX board 603.

After this, the multifunction unit 1 cuts the communication once (disconnect), and if it is desired to update the version of the firmware (for example if the user wishes to update the version, and if the multifunction unit is set to automatic update), then the procedure moves directly to the second communication operation (communication state B in FIG. 3). In the second communication operation, as described above, the multifunction unit 1 dials the number of the service center stored and saved in the memory 603b of the FAX board 603 and calls the service center. Furthermore, the multifunction unit 1 returns the password that was received in the first communication operation to the service center at this time, together with its own machine number (serial number). Thus, by carrying out such an operation, the party to whom the multifunction unit 1 is transmitting in the second communication operation is the official service center. Furthermore, by confirming that the password that was transmitted in the first communication operation has been returned, the service center can confirm that the communicating partner in the second communication operation is the correct multifunction unit 1.

In this way, information (information about the new version of the firmware) from the service center is provided (transmitted) to the multifunction unit 1 in the state at which the second communication operation is performed, (communication state C in FIG. 3) and processes are executed in the multifunction unit 1 in accordance with this information.

As the processes performed in the multifunction unit 1, first of all the new version of the firmware is received from the service center, and that information is stored in the memory 603b of the FAX board 603, or on the HD 503 (referred to in the present invention as information saving means). Then, after the new version has been completely received, the multifunction unit takes the new version that is stored, and overwrites the firmware under the control of the CPU 201 (referred to in the present invention as overwriting means) of the machine control board 200. Also at this time, the line of communication of the second communication operation is still open, and "version update started" information is transmitted from the multifunction unit 1 to the service center (notification that overwriting of the firmware has started) (communication state D in FIG. 3). The line of communication of the second communication operation is kept open during overwriting. Then, when the firmware is completely overwritten, the multifunction unit 1 transmits "version update completed" information to the service center (notification that overwriting of the firmware has been completed correctly) (communication state E in FIG. 3), and after this, stops the communication (disconnect).

When the firmware is completely overwritten in this manner, after the power of the composite machine 1 is turned off, the machine is upgraded by turning the machine on.

It should be noted that if the service center has not received the "version update started" information from the multifunction unit 1 after a predetermined time interval has passed after transmission of the new version of the firmware is complete, or, although the "version update started" information has been received, after that, if the "version update completed" information is not received from the multifunction unit after a predetermined time interval has passed, then the service center judges that the updated version has not been correctly transmitted to the multifunction unit 1 because of the occurrence of problems such as a power loss or noise during transmission, or that despite the new version being transmitted completely, the firmware was not correctly overwritten. Thus the first communication operation is performed again, and the operations described above repeated. At this time, the multifunction unit 1 judges that the firmware could not be updated, it waits for the first communication operation to start with a call from the service center, and repeats the foregoing operations when the call comes from the service center.

Because the new version of the firmware of the multifunction unit 1 is updated in accordance with the above-noted communication operation, in the present embodiment, even, for example, if the first communication operation is started by a malicious party disguised as the official service center, then because the communication is cut once, and the second communication operation is performed after this by a call from the multifunction unit 1, there is no communication between the multifunction unit 1 and the malicious party, and so there are no computer virus infections or information leaks from the multifunction unit 1 caused by the malicious party. Thus, it is possible to realize a highly secure communication state.

Furthermore, the multifunction unit 1 is set such that the firmware is overwritten after the new version of the firmware is completely received, as described above. If, for example, the receiving operation of the new version of the firmware (the second communication operation), and the overwriting operation of the firmware were carried out simultaneously, then if an error were to occur during the second communication operation (problems due to power loss or noise), then the firmware would be in an uncompleted state, and there is a possibility that recovery would be impossible. In the present embodiment, since the firmware is overwritten after the new version of the firmware has been completely received, even if a transmission error occurs, then it is possible to retain the previous firmware version, and it is possible to realize a highly robust operation for updating the firmware to a new version.

It should be noted that if the password is set such that it is invalidated after a predetermined time interval has passed after the first communication operation is cut, then even if the password is leaked, then there is a high possibility that it will be invalid before it can be used by any malicious party, and it is possible to obtain a more secure system. In addition, if the password is invalidated directly after the information supplied by the service center to the multifunction unit 1 in the second communication operation is complete, then it is possible to avoid a situation in which a third party maliciously uses the password.

It should be noted that a region in which overwriting by the firmware overwriting operation based on the new version received from the service center is prohibited is provided in the region in which the firmware is stored in the memory that stores the firmware. This region is a part in which a program (including the program for performing the above-noted communication operations) is stored. Thus, if overwriting of the firmware fails due to communication errors, or if it the firmware is accidentally overwritten with incorrect data, then it is possible to request, and carry out the version updating process again, a situation in which the multifunction unit 1 cannot be started up can be avoided, and it is possible to construct a highly reliable system.

Other Embodiments

The embodiment described above has been described with respect to a case in which the firmware of a multifunction unit 1 that is provided with a facsimile function is updated to a new version. This is not a limitation to the present invention, and the present invention may be applied to a case in which various settings (such as setting an energy saver mode, or setting a 2-in-1 copy function, or the like) of the multifunction unit 1 are changed in response to a user request by providing the setting changes by communication. Furthermore, the information receiving device is not limited to the multifunction unit, and may be a telephone provided with a facsimile function, or a personal computer, for example, and the present invention may be applied to various apparatuses that have a communication function.

Furthermore, the password transmitted to the multifunction unit 1 from the service center in the first communication operation is not limited to a simple string of letters, and may utilize a public key method using a "secret key" and a "public key". In this case, the "secret key" is changed with every communication, while the "public key" is a fixed password.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. A communication method, executed on a communication system, which is constructed of a trusted information providing device that has a communication function and an information receiving device that has a communication function, wherein the communication system is configured such that information is provided from the trusted information providing device to the information receiving device;

wherein a first communication operation is performed, in which the information receiving device communicates in response to an external call from a device representing itself as a correct information providing device; after which a first severing operation to cut the communication is performed to determine whether communication from the device representing itself as the correct information providing device can be verified as being communication from the trusted information providing device; after which a second communication operation is performed in which communication is carried out between the trusted information providing device and the information receiving device by the information receiving device calling the trusted information providing device using information providing device information that is stored and saved in advance in the information receiving device to determine whether the device representing itself as the correct information providing device is the trusted information providing device, and wherein in the second communication operation, information is provided from the trusted information providing device to the information receiving device, and after which a second severing operation is performed to cut the second communication operation after the information is completely provided from the trusted information providing device, wherein the information provided from the trusted information providing device to the information receiving device in the second communication operation is information for updating a version of a firmware of the information receiving device, and wherein the information receiving device is configured such that after receiving the information for updating the version of the firmware, a firmware overwriting operation is performed based on the information, wherein the device representing itself as the correct information providing device is set so as to notify the information receiving device of a password in the first communication operation, whereas the information receiving device is configured so as to return the password to the trusted information providing device during the second communication operation, and wherein the password that is notified from the device representing itself as the correct information providing device to the information receiving device in the first communication operation is invalidated after completion of an operation providing information from the trusted information providing device to the information receiving device in the second communication operation.

2. The communication method according to claim 1, wherein, in the first communication operation, the device representing itself as the correct information providing device notifies the receiving device that information is available and notifies the information receiving device of a communication password for receiving the information.

3. The communication method according to claim 1, wherein, in the first communication operation, the device representing itself as the correct information providing device notifies the receiving device that information is available and notifies the information receiving device of a communication password for receiving the information, and wherein in the second communication operation, the information receiving device returns the password that was received in the first communication operation, together with a machine number of the information receiving device.

4. A communication system, which is constructed of a trusted information providing device that has a communication function and an information receiving device that has a communication function, wherein the communication system is configured such that information is provided from the trusted information providing device to the information receiving device;

wherein the information receiving device is provided with a memory portion in which trusted information providing device information is stored in advance, and the information receiving device is configured such that a first communication operation is performed, in which the information receiving device communicates in response to an external call from a device representing itself as a correct information providing device, after which a first severing operation to cut the communication is performed to determine whether communication from the device representing itself as the correct information providing device can be verified as being communication from the trusted information providing device, after which a second communication operation is performed in which communication is carried out between the trusted information providing device and the information receiving device by the information receiving device calling the trusted information providing device using the information providing device information to determine whether the device representing itself as the correct information providing device is the trusted information providing device, and wherein in the second communication operation, information is provided from the information providing device to the information receiving device, and after which a second severing operation is performed to cut the second communication operation after the information is completely provided from the trusted information providing device, wherein the information provided from the trusted information providing device to the information receiving device in the second communication operation is information for updating a version of a firmware of the information receiving device, and wherein the information receiving device is configured such that after receiving the information for updating the version of the firmware, a firmware overwriting operation is performed based on the information, wherein the device representing itself as the correct information providing device is set so as to notify the information receiving device of a password in the first communication operation, whereas the information receiving device is configured so as to return the password to the trusted information providing device during the second communication operation, and wherein the password that is notified from the device representing itself as the correct information providing device to the information receiving device in the first communication operation is invalidated after completion of an operation providing information from the trusted information providing device to the information receiving device in the second communication operation.

5. The communication system according to claim 4, wherein the password that is notified from the device representing itself as the correct information providing device to the information receiving device in the first communication operation is invalidated after a predetermined time interval after the first communication operation is cut.

6. The communication system according to claim 5, wherein the password that is notified from the device representing itself as the correct information providing device to the information receiving device in the first communication operation is invalidated after completion of an operation providing information from the trusted information providing device to the information receiving device in the second communication operation.

7. An The information receiving device in which a communication system according to claim 5 is used, the information receiving device comprising:

information saving means for temporarily saving the information for updating a version of the firmware that is received, and overwriting means for retrieving the information for updating a version of the firmware that was received, and overwriting the firmware.

8. The communication system according to claim 4, wherein the information receiving device is configured such that when the firmware overwriting operation that is based on the information that is received is completed, the information receiving device notifies that fact to the trusted information providing device.

9. The communication system according to claim 8, wherein a firmware recording region in the information receiving device is provided with a region that the firmware overwriting operation that is based on the information that is received is prohibited to overwrite.

10. An The information receiving device in which a communication system according to claim 8 is used, the information receiving device comprising:

information saving means for temporarily saving the information for updating a version of the firmware that is received, and overwriting means for retrieving the information for updating a version of the firmware that was received, and overwriting the firmware.

11. The communication system according to claim 4, wherein a firmware recording region in the information receiving device is provided with a region that the firmware overwriting operation that is based on the information that is received is prohibited to overwrite.

12. The information receiving device in which a communication system according to claim 11 is used, the information receiving device comprising:

information saving means for temporarily saving the information for updating a version of the firmware that is received, and overwriting means for retrieving the information for updating a version of the firmware that was received, and overwriting the firmware.

13. The information receiving device in which a communication system according to claim 4 is used, the information receiving device comprising:

information saving means for temporarily saving the information for updating a version of the firmware that is received, and overwriting means for retrieving the information for updating a version of the firmware that was received, and overwriting the firmware.

14. The communication system according to claim 4, wherein, in the first communication operation, the device representing itself as the correct information providing device notifies the receiving device that information is available and notifies the information receiving device of a communication password for receiving the information.

15. The communication system according to claim 4, wherein, in the first communication operation, the device representing itself as the correct information providing device notifies the receiving device that information is available and notifies the information receiving device of a communication password for receiving the information, and wherein in the second communication operation, the information receiving device returns the password that was received in the first communication operation, together with a machine number of the information receiving device.

* * * * *